(12) United States Patent
Evans

(10) Patent No.: US 6,871,012 B1
(45) Date of Patent: Mar. 22, 2005

(54) UNIQUE DIGITAL CONTENT IDENTIFIER GENERATING METHODS AND ARRANGEMENTS

(75) Inventor: Glenn F. Evans, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 1015 days.

(21) Appl. No.: 09/721,413

(22) Filed: Nov. 22, 2000

(51) Int. Cl.[7] ............... H04N 5/85; H04N 5/781
(52) U.S. Cl. ........................ 386/125; 386/124
(58) Field of Search ............... 386/125, 124, 386/126, 104, 105, 106, 109, 111, 112, 52, 45, 46, 40, 27, 33, 4, 1; H04N 5/85, 5/781

(56) References Cited

U.S. PATENT DOCUMENTS 5,541,738 A * 7/1996 Mankovitz ............ 386/83

FOREIGN PATENT DOCUMENTS

JP 411232838 A * 8/1999

* cited by examiner

Primary Examiner—Robert Chevalier
(74) Attorney, Agent, or Firm—Lee & Hayes, PLLC

(57) ABSTRACT

In accordance with certain aspects of the present invention, enhancements have been developed to further extend the performance of the generic DVD navigator component. Of significance herein, was the need to assign a unique identifier to DVD discs and the like. Doing so allows player applications to easily identify, catalogue and associate information with each disc. Previous "unique" ID algorithms have failed to produce useful and reliable identifiers. Thus, improved methods and arrangements are provided for use in the generic DVD navigator that produces substantially, statistically unique disc IDs.

16 Claims, 7 Drawing Sheets

UNIQUE DIGITAL CONTENT IDENTIFIER GENERATING METHODS AND ARRANGEMENTS

RELATED APPLICATIONS

This patent application is related to co-pending U.S. patent Ser. Nos. 09/721,266, 09/721,400, 09/721,402, 09/721,262, 09/721,542.

TECHNICAL FIELD

This invention relates to computers and like devices, and more particularly to unique digital content identifier generating methods and arrangements.

BACKGROUND

A digital versatile disc (DVD) player is composed of three logical units, as defined in the DVD specification. The first logical unit is a DVD player application that presents an interface to the user and relays user commands to the second logical unit. The second logical unit a DVD navigator that reads and interprets the information on the DVD and controls which segments of video and audio are processed based on the user commands. The third logical unit is a DVD presentation layer that decompresses data read from the DVD and presents the corresponding audio, video and subpicture streams, as applicable, to one or more renderers.

These logical units may be implemented in hardware and/or software. By way of example, in certain implementations, the DVD player is implanted via a graphical user interface (GUI) that is displayed to a user, and through which the user is able to selectively control playback, etc., of the DVD using a pointing selection input device, e.g., a mouse. This is usually a fairly straightforward task for system developers and allows for easy customization.

Implementing a DVD navigator, on the other hand, tends to be a more complex task. This is especially true for applications that seek to integrate DVD information into presentations and the like. Here, each developer entity would need to provide a mechanism for reading and interpreting their DVD, and interfacing with the decoder mechanism in the DVD presentation layer. Moreover, the decoder mechanism in the DVD presentation layer will likely be a product of a third party; making the task of authoring a DVD navigator even more difficult, the navigator must interface to many different decoder mechanisms.

Consequently, there is a need for a powerful yet simplified and consistent interface that player applications can use to control the DVD navigator program.

SUMMARY OF THE INVENTION

Recognizing the potential burdens placed on application developers, Microsoft Corporation, in an effort to further enhance their operating system and the user's environment have developed a generic navigator component. This generic navigator component provides a standard, specification-compliant DVD navigator as part of Windows® to help application developers avoid such possibly repetitive and difficult tasks. This generic navigator component exposes two application programming interfaces (APIs) that combined provide a powerful, yet simplified and consistent interface that player applications can use to control the DVD navigator. The APIs have been designed to further influence the flexibility and usefulness of the underlying DVD Navigator.

In accordance with certain aspects of the present invention, enhancements have been developed to further extend the performance of the generic navigator component. Of significance herein, was the need to assign a unique identifier to DVD discs and the like. Doing so allows player applications to easily identify, catalogue and associate information with each disc. Previous "unique" ID algorithms have failed to produce useful and reliable identifiers. Thus, there was a need for improved methods and arrangements for use in the generic navigator that produces substantially, statistically unique disc IDs.

BRIEF DESCRIPTION OF THE DRAWINGS

A more complete understanding of the various methods and arrangements of the present invention may be had by reference to the following detailed description when taken in conjunction with the accompanying drawings wherein.

DETAILED DESCRIPTION

The following exemplary methods and arrangements describe certain enhancements and features associated with a generic DVD navigator having APIs exposed to DVD player applications. These are referred to as the DVD navigator and DVD2 APIs. It is noted that while most of the description is directed towards a PC running the Windows® operating system, the various methods and arrangements are clearly applicable to other operating systems, devices, etc.

Moreover, the use of the term DVD is not meant to exclude other media formats. Thus, the DVD content itself may come from a hard drive, a compact disc, over a network, and the like.

As will be described, the DVD navigator and/or DVD2 API enable a player application to interactively control the playback of DVD content. The DVD2 API consists of two interfaces. The first is termed "IDvdlnfo2". The second is termed "IDvdControl2". The player application may use the IDvdlnfo2 interface to query the current state of the DVD navigator and the IDvdControl2 interface to better control playback and/or to alter the DVD navigator's state.

The DVD2 API provides several unique and novel features. For example, thread-based synchronization methods are provided for real-time playback; a playback control mechanism is provided to determine the degree of interactivity; communication mechanisms are provided between the player application and the disc program, playing of time ranges is supported; mechanisms are provided for coordinating and handling parental level requests and for determining the minimal parental level to play a restricted segment of content; and, a unique disc identifier algorithm is provided, which further supports the bookmarking of any location within the DVD content.

Figure 1:
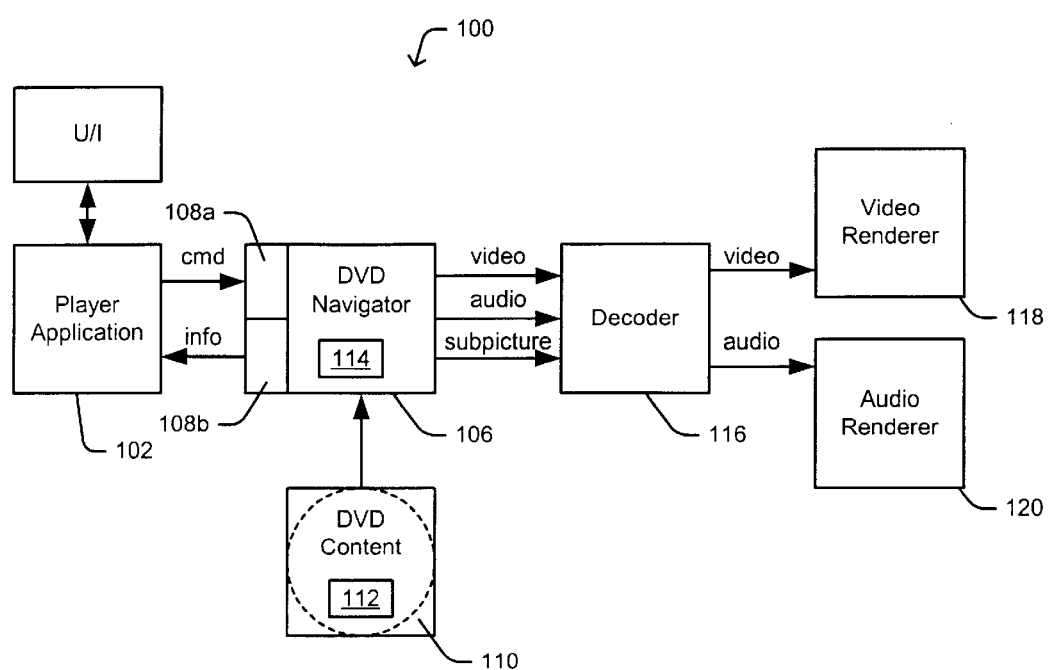
FIG. 1 is a block diagram depicting an exemplary DVD player device.

With this mind, attention is drawn to FIG. 1, which depicts an exemplary DVD player 100. Player 100 includes at least one player application 102 configured to present the user with a user interface (U/I) 104. Through U/I 104, the user is able to instruct player application 102 with regard to the playback of DVD content 110.

As illustrated, player application 102 is provided with DVD2 API 108a and 108b to communicate user requests, and receive feedback information, respectively. DVD2 API 108a-b provide access to the functions within navigator 106. Navigator 106 interacts with DVD content 110, which in addition to media information includes a program 112. Program 112 defines the menus, jumps, etc., associated with the remaining content. Navigator 106 includes a state 114 associated with the playback process. Here, in state 114, for example, the current user operation (UOP) (e.g., play, stop, pause, reverse, fast-forward, slow motion, angle, etc.) is stored along with the current location within the DVD content (e.g., chapter, time, frame) and certain other registers such as those that could record recent jumps/UOPs.

The output of navigator 106 includes an encoded video stream, an encoded audio stream, and a subpicture stream, as applicable. These outputs are inputted to a decoder 116, which is configured to decode (decrypt and decompress) the encoded data and output the corresponding streams to the applicable video renderer 118 or audio renderer 120. Renderer 118 causes the video information to be displayed to the user, for example, via a video monitor. Renderer 120 causes the audio information to be reproduces for the listener, for example, via one or more speakers.

Figure 2:
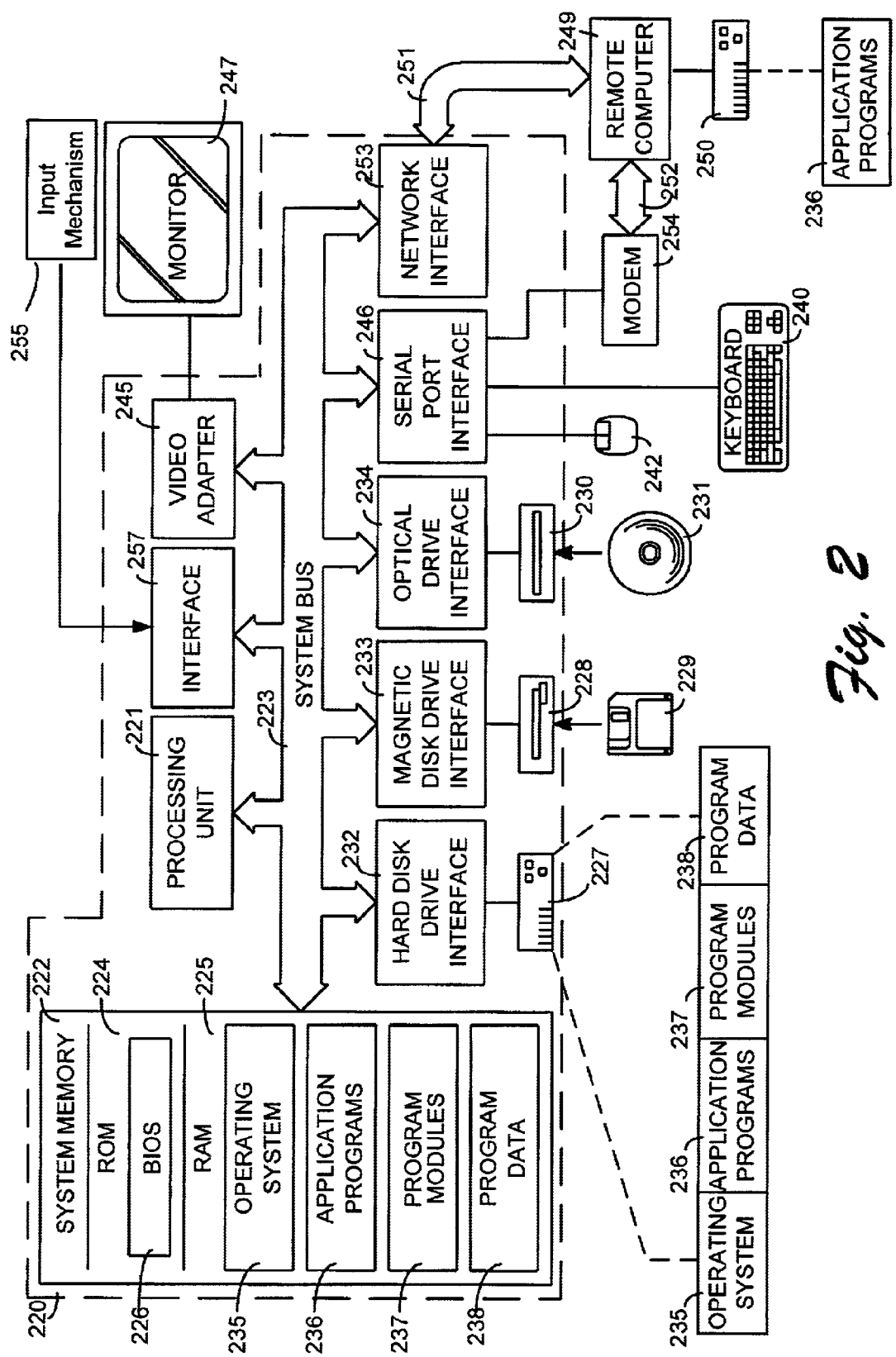
FIG. 2 is a block diagram of a computer environment suitable for use with the DVD player device in FIG. 1.

Attention is now drawn to FIG. 2, which is a block diagram depicting an exemplary computing system 200 suitable for use with the arrangement in FIG. 1.

Computing system 200 is, in this example, in the form of a personal computer (PC), however, in other examples computing system may take the form of a dedicated server(s), a special-purpose device, an appliance, a handheld computing device, a mobile telephone device, a pager device, etc.

As shown, computing system 200 includes a processing unit 221, a system memory 222, and a system bus 223. System bus 223 links together various system components including system memory 222 and the processing unit 221. System bus 223 may be any of several types of bus structures including a memory bus or memory controller, a peripheral bus, and a local bus using any of a variety of bus architectures. System memory 222 typically includes read only memory (ROM) 224 and random access memory (RAM) 225. A basic input/output system 226 (BIOS), containing the basic routine that helps to transfer information between elements within computing system 200, such as during start-up, is stored in ROM 224. Computing system 200 further includes a hard disk drive 227 for reading from and writing to a hard disk, not shown, a magnetic disk drive 228 for reading from or writing to a removable magnetic disk 229, and an optical disk drive 30 for reading from or writing to a removable optical disk 231 such as a CD ROM or other optical media. Hard disk drive 227, magnetic disk drive 228, and optical disk drive 230 are connected to system bus 223 by a hard disk drive interface 232, a magnetic disk drive interface 233, and an optical drive interface 234, respectively. These drives and their associated computer-readable media provide nonvolatile storage of computer readable instructions, data structures, computer programs and other data for computing system 200.

A number of computer programs may be stored on the hard disk, magnetic disk 229, optical disk 231, ROM 224 or RAM 225, including an operating system 235, one or more application programs 236, other programs 237, and program data 238.

A user may enter commands and information into computing system 200 through various input devices such as a keyboard 240 and pointing device 242 (such as a mouse). A camera/microphone 255 or other like media device capable of capturing or otherwise outputting real-time data 256 can also be included as an input device to computing system 200. The real-time data 256 can be input into computing system 200 via an appropriate interface 257. Interface 257 can be connected to the system bus 223, thereby allowing real-time data 256 to be stored in RAM 225, or one of the other data storage devices, or otherwise processed.

As shown, a monitor 247 or other type of display device is also connected to the system bus 223 via an interface, such as a video adapter 248. In addition to the monitor, computing system 200 may also include other peripheral output devices (not shown), such as speakers, printers, etc.

Computing system 200 may operate in a networked environment using logical connections to one or more remote computers, such as a remote computer 249. Remote computer 249 may be another personal computer, a server, a router, a network PC, a peer device or other common network node, and typically includes many or all of the elements described above relative to computing system 200, although only a memory storage device 250 has been illustrated in FIG. 2.

The logical connections depicted in FIG. 2 include a local area network (LAN) 251 and a wide area network (WAN) 252. Such networking environments are commonplace in offices, enterprise-wide computer networks, Intranets and the Internet.

When used in a LAN networking environment, computing system 200 is connected to the local network 251 through a network interface or adapter 253. When used in a WAN networking environment, computing system 200 typically includes a modem 254 or other means for establishing communications over the wide area network 252, such as the Internet. Modem 254, which may be internal or external, is connected to system bus 223 via the serial port interface 246.

In a networked environment, computer programs depicted relative to the computing system 200, or portions thereof, may be stored in the remote memory storage device. It will be appreciated that the network connections shown are exemplary and other means of establishing a communications link between the computers may be used.

DVD2 API 108a–b simplifies application authoring, adds functionality and solves many difficult synchronization issues common to DVD player applications development. Basically, a common DVD API helps discourage proprietary single-use monolithic DVD solutions that serve only as standalone DVD player applications. It also allows various applications (such as presentation programs, DVD players, games, or interactive learning programs) to add DVD support without having to know which DVD decoder or DVD hardware support is on the user's system. Historically, custom DVD solutions tend to be very hardware dependent and have limited upgrade options for users.

As will be described in greater detail below, DVD2 API 108a–b adds flexible synchronization mechanisms for the application to know the completion status of requests made to the DVD Navigator 106. The new command completion notification allows the application to concurrently perform other tasks and be informed of the status of a previous request. Previous DVD APIs assumed that either the application would be blocked until the request was completed, or would not send any notification to the application. Applications now have the option of receiving a synchronization object that they can use to wait on or are notified about completion events.

The synchronization mechanism also returns the status of the request that indicates whether it succeeded or returns the reason (an error code) for its failure. Previous DVD APIs would appear to successfully execute requests that would later fail due to changed state when the DVD Navigator 106 actually started processing them. At that point, there was no way to propagate the error indication back to the player application 102. The new mechanism also notifies the player application 102 of every request that is cancelled or overridden by the disc's program 112 or by further user actions.

Current DVD APIs use predefined behaviors that dictate how a command interacts with the current display. When a player application issues a new request, it pre-empts and cancels any content (video or audio) that is being played. Alternatively, the APIs semantics dictate that the current presentation completes before the new content is presented which forces the user to wait before he/she can request another action. Interactive applications such as DVD players and games may require the first behavior (instant effect), but other applications such as a slideshow may require the second behavior (complete the current presentation). Since these two options are mutually exclusive, predefined API's semantics cannot accommodate both. DVD2 API 108a–b allows player application 102 to indicate the desired behavior via flags, and also how it interacts with the synchronization mechanism.

Figure 9:
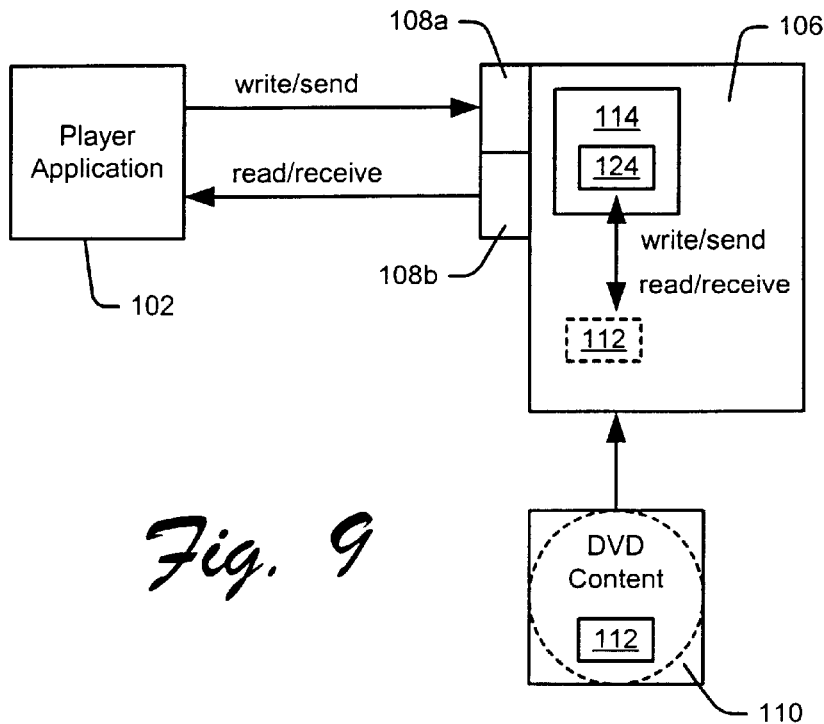
FIG. 9 is a block diagram depicting exemplary read/write communication functionality between a player application and a program related to media content.

DVD navigator 106 is configured to simulate a virtual CPU that uses an execution state 114 (in the form of a set of memory registers 124 (see, FIG. 9)). Previous DVD APIs allowed applications to read the contents of the registers. DVD2 API 108a–b also allows player application 102 to also change the contents of the memory registers. The combined read/write functionality allows player application 102 to essentially 'communicate' with program 112, as illustrated in FIG. 9.

Figure 12:
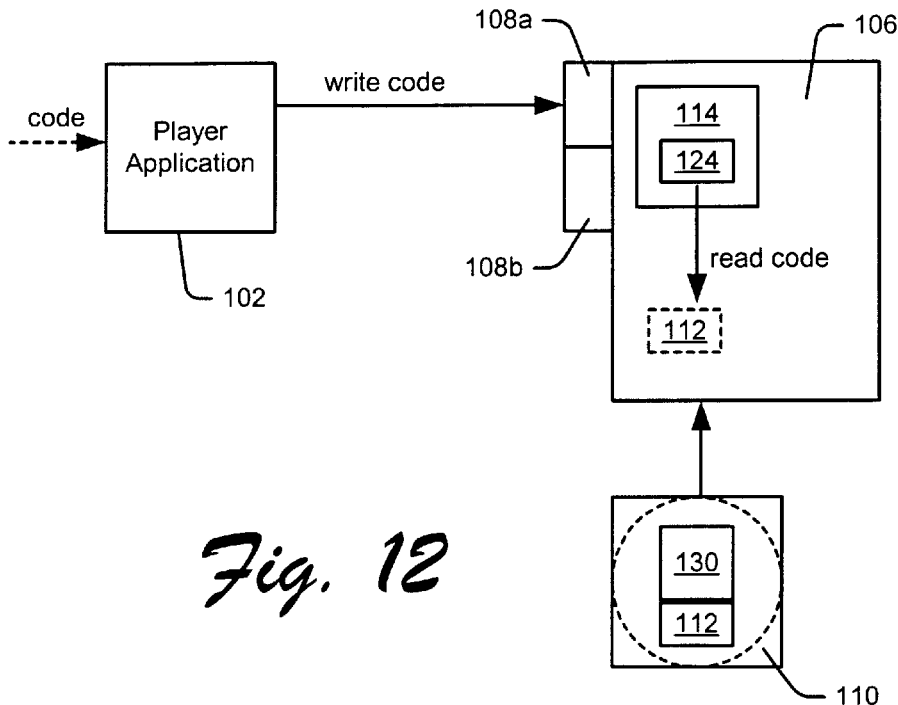
FIG. 12 is a block diagram depicting an exemplary method for controlling access to media data through the use of a player application supplied code.

The read and write methods works in such a way that they can also be used for synchronization. By way of example, with read/write functionality, player application 102 can implement 'controlled unlocking' or restricted access to all or portions of DVD content 110. With controlled unlocking, the user may be restricted from viewing portions of the disc until player application 102 sets specific memory registers. Player application 102 could receive this information from the content's author, the user, another program, a website, or the like. For example, FIG. 12 depicts the use of a code being written to registers 124 by player application 102 and being read by program 112. If the code is correct, then portion 130 of DVD content 110 can be played back.

In certain implementations, DVD2 API 108a-b contains a simplified naming scheme for the potential user operations suggested in the DVD specification Annex J. The DVD2 API uses less DVD jargon and features a more intuitive naming scheme. The user operation names proposed in the DVD specification are unclear and can lead to incorrect usage or under-utilization by application programs. The names now suggest their usage instead of an abstract label. Also time codes are now returned in a simple integer format instead of the awkward BCD coding.

Figure 10:
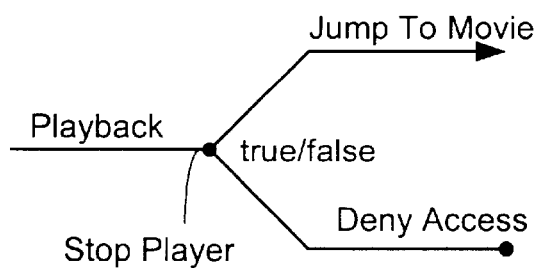
FIG. 10 is a line diagram depicting a dual-branch playback decision point associated with restricted/parental control over media content.

Some previous DVD APIs failed to correctly handle minimum parental level branching by having the DVD navigator send an error event indicating that the branch always failed (see FIG. 10). The player application then had to increase the parental level and restart the movie from the beginning. If the branch fails, the player application would need to stop the playback to enter the STOP domain to change the parental level. It can only continue by restarting the movie.

To the contrary, DVD2 API 108a–b has a mode that pauses navigator 106 and lets player application 102 respond to the parental level increase request before the navigator 106 continues. If the increase request is granted, the playback continues without requiring the user to start the movie from the beginning. The DVD specification only states that the navigator should pause until it knows whether the request succeeded or failed. It does not describe a mechanism to accomplish this task and suggests that the Navigator "calls the Temporary Parental Level Change feature built into the player" (4.6.4.1 V14–197).

Figure 11:
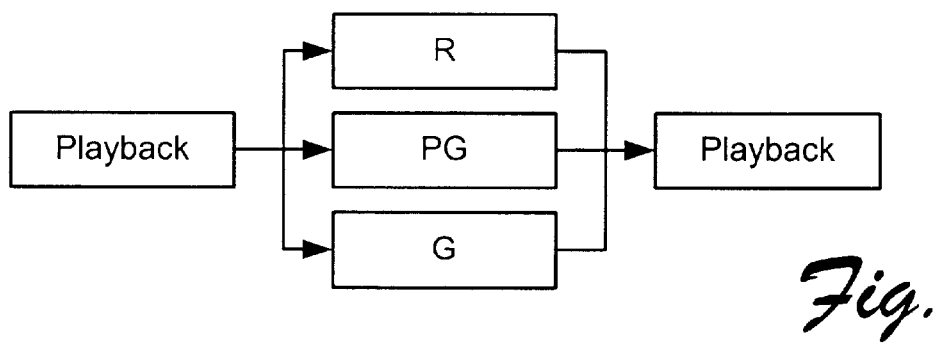
FIG. 11 is a line diagram depicting a multiple-branch playback decision point associated with restricted/parental control over media content.

Nor does the DVD specification describe any mechanism to allow the user to play multi-segment parent level branches (see, e.g., FIG. 11). As such, previous DVD APIs did not provide a mechanism that allowed the user to play multi-segment (or multiple-branch) parent level branches if no branches were permitted at the current user level. In the past, the navigator only notified the application that the playback has stopped, since no branch was available for the current parental level.

To the contrary, navigator 106 and DVD2 API 108a–b compute the minimum level required to play the block and return this value along with a playback stopped' notification. The application can then notify the user of the required parental level that is required to continue playing DVD content 110. Thus, the user no longer has to guess the required level through trial and error, having to restart the movie on each try.

Additionally, DVD2 API 108a–b extends the functionality of the DVD Annex J specification and previous DVD APIs. The DVD Annex J specification only specifies actions to perform. It does not specify how player application 102 finds out information about the disc or the DVD navigator's state 114. Here, new disc and navigation state query functionality is provided.

Unlike previous DVD APIs, DVD2 API 108a-b does not require the application writer to already have a ready copy of the DVD specification to use it (e.g., due to the incomplete description of the data returned by the API). The data returned by the methods to get the textual information, the title attributes, audio attributes and subpicture attributes is documented so that application developers can get the necessary information from the new API and the associated documentation.

DVD2 API 108a–b also allows the application to query the attributes of arbitrary title indices instead of just the current title index. DVD2 API 108a–b also returns the audio stream's Karaoke information so that intelligent Karaoke applications can be implemented. DVD2 API 108a–b also returns the capabilities of decoder 116 so the application can present configuration options to the user (like frame stepping in both direction, smooth rewind and fast-forward etc.) or intelligently alter the user interface. New control functionality is also provided. For example, DVD2 API 108a–b allows player application 102 to play ranges of chapters or ranges of times, to select specific menu buttons (just not relative buttons) and allows the user to select buttons using a mouse location. It also supports the getting/setting of bookmark objects and the ability to query a calculated current unique disc ID.

To better understand the synchronization mechanism of the DVD2 API 108a–b and the associated navigator 106, with the application the following sections examine various exemplarily modes of operation and point out some of the benefits and shortcomings. Essentially, there are four modes of operation, along with certain other variations thereto. The initial four modes are illustrated in FIGS. 3 through 6. Each of these modes may be supported by the various methods and arrangements in accordance with the present invention.

Figure 3:
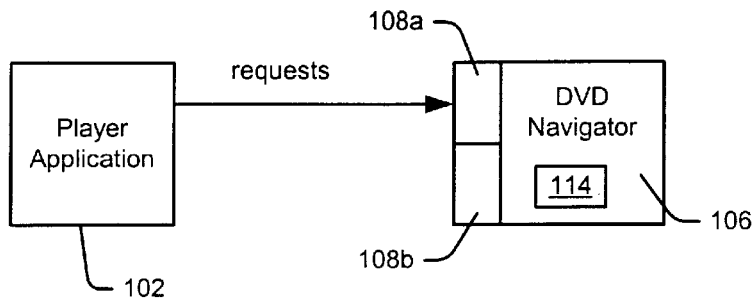
FIG. 3 is, a block diagram depicting a first mode of synchronization between a DVD player application and a generic navigator program.

A "don't care" mode or model is depicted in FIG. 3, wherein player application 102 sends a request to navigator 106, without caring about what the result, if any, there is, and/or when the request is completed. An example might be a jump to location request, a show menu request, etc. Here, player application essentially assumes that the requested operation has been completed.

Figure 4:
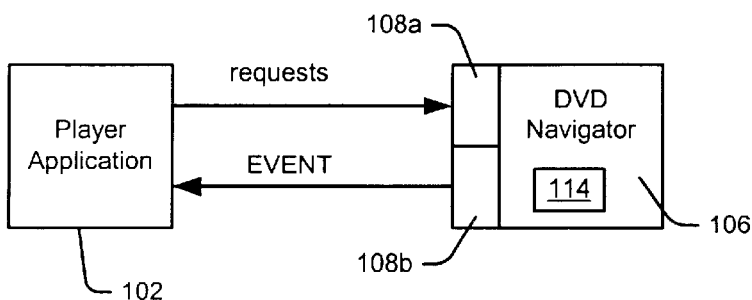
FIG. 4 is, a block diagram depicting a second mode of synchronization between a DVD player application and a generic navigator program.

In FIG. 4, an event mode or model is illustrated. Here, player application 102 is provided notice upon a generic event sent by the navigator (when the request is completed). One drawback to this model is that player application 102 may have made more than one request and would not be able to tell the events apart.

Figure 5:
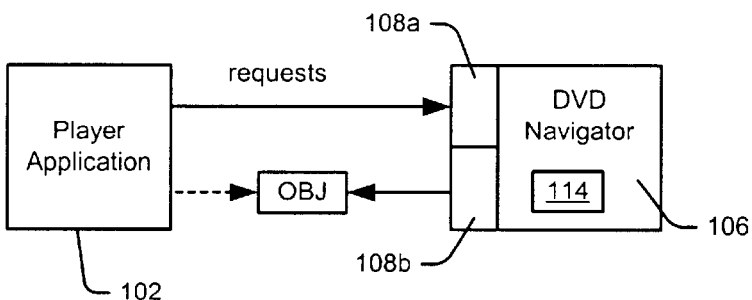
FIG. 5 is, a block diagram depicting a third mode of synchronization between a DVD player application and a generic navigator program.

An improvement is provided in FIG. 5. Here, rather than having an event provide notice to player application 102, navigator 106 generates an object that can then be used by player application 102 to track the status of the request. This provides player application 102 with the ability to conduct instance tracking.

Figure 6:
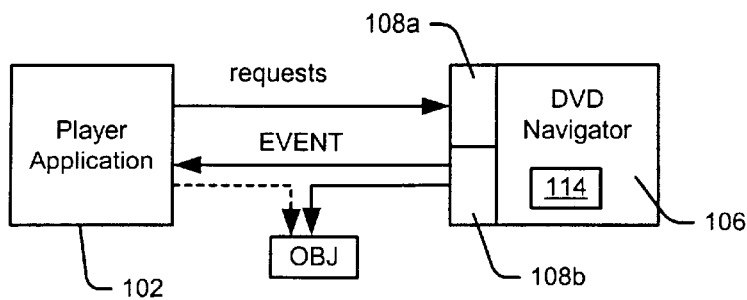
FIG. 6 is, a block diagram depicting a fourth mode of synchronization between a DVD player application and a generic navigator program.

In yet another improvement, as illustrated in FIG. 6, navigator 106 can generate an object that can be used for tracking and also a subsequent event. In this manner, player application 102 can use the objects to tell events apart. Therefore, this model supports multiple instance tracking.

Figure 7:
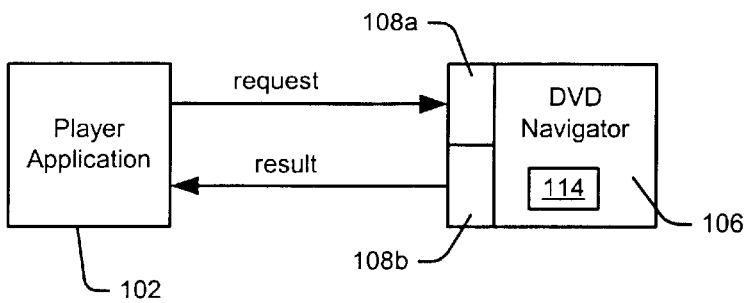
FIGS. 7 and 8 are block diagrams depicting non-blocking and blocking modes of synchronization, respectively, between a DVD player application and a generic navigator program.

Before describing further details of these various models and the DVD2 API 108a–b, the deficiencies of a blocking-only API or a non-blocking-only API will be described. One variation is depicted in FIG. 7. Here, player application 102 sends a request to navigator 106 (via DVD2 API 108a, of course). The player application 102 must wait for a result message from navigator 106. One drawback to this model is that U/I 104 will probably be "frozen" while player application 102 waits.

Figure 8:
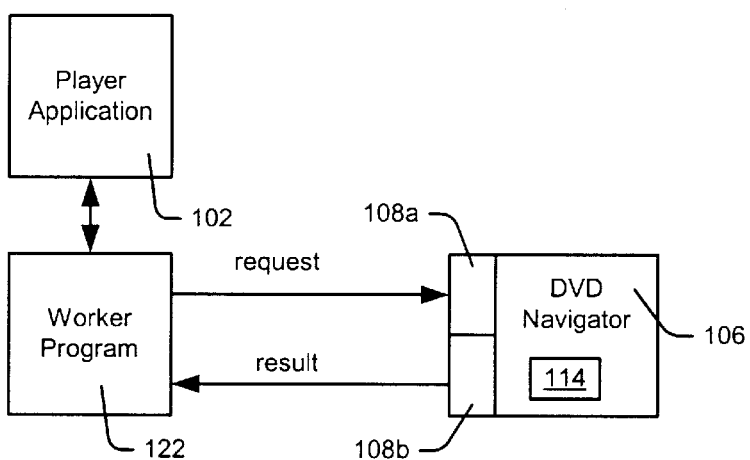

One way to solve the frozen U/I problem is to provide a worker program, such as is depicted in FIG. 8. Here, the worker program receives the request and forwards it to navigator 106 and then itself waits for the result message. Once the worker receives the result message then it is forwarded to player application 102. While this may free up U/I 104, it may be difficult to manage several workers operating simultaneously.

In contrast, a non-blocking API is equivalent to the "don't care" mode. There is no direct feedback on the status or result of an operation. The application must infer the status from changes in the playback (time changes, menu changes, etc). However, due to variation in disc content and structure, this approach is very unreliable and error prone. With this in mind, the following sections provide additional details into the use of DVD2 API 108a–b.

All of the IDVDControl methods in previous DVD APIs run asynchronously to the application (a non-blocking-only model). Thus, when an application 102 calls a method, the navigator 106 performs preliminary verifications and then immediately returns a result. However, in the meantime, the state of the DVD Navigator may have changed and the request may fail when the DVD Navigator actually begins to execute the command.

One solution is to change the semantics of the DVD API to ensure that methods do not return until all requests complete. But to retain the asynchronous behavior, applications must create separate execution paths (e.g., helper threads) to manage DVD API calls (as descried above in a blocking-only model). Multithreaded programming models always complicate application development, especially simple scriptable interfaces.

Therefore, to solve this problem, the DVD2 API 108a–b creates associated synchronization command objects. The command object allows the application to synchronize and to learn about the command's status. Each API method is extended with two extra arguments. The general form of a DVD2 API command is:

HRESULT IDVDControl2::Command(arguments, dwFlags, IDvdCmd**ppObj)

Wherein: ppObject is an argument used to return a synchronization COM (Component Object Model) object to application 102; and, dwFlags is the set of flags passed to the method to determine the behavior and usage of the synchronization object. These are a bitwise union of the available pre-defined flags.

The synchronization object has the following interface:

```
interface IDvdCmd : IUnknown
{
HRESULT WaitForStart( );
HRESULT WaitForEnd( );
}
```

The object returned must be released by the application. By returning a pre-incremented COM object, the life of the object can be correctly maintained. A variation on the interface also extends the original interface by including two methods that allow the application to wait on the start and end occurance along with other changes in the system:

HANDLE GetStartHandle( );

HANDLE GetEndHandle( );

The flags take the following values:

DVD_CMD_FLAG_SendEvents —events are sent regarding the request's status

DVD_CMD_FLAG_Block —do not continue until the command has been completed

DVD_CMD_FLAG_None —a placeholder indicating no flags.

The special return code VFW_E_DVD_CMD_CANCELLED is returned by the initial DVD API method, by the IDvdCmd::WaitForStart or IDvdCmd::WaitForEnd or along with the event indication that the command was pre-empted and is no longer valid.

A sample example of C++ usage of a command object is as follows:

```
IDvdCmd* pObj;
HRESULT hres = IDvdControl2->PlayTitle (15, DVD_CMD_FLAG_None, &pObj);
// don't wait or notify
pQbj->Release( );
```

As described above, player application 102 can determine the commencement and completion of the command, by any of the following: using the command object directly, using no command objects, listening to command related events, using a combination of events and objects to aid in tracking multiple instances of a command.

Using Objects

By passing an IDvdCmd pointer to the command, the Navigator will allocate and return a new IDvdCmd object. Calling the interface method IDvdCmd::WaitForStart( ) will block until the command begins and IDvdCmd::WaitForEnd( ) waits until the command completes. If the command has been cancelled, then the Navigator will return VFW_E_COMMAND_CANCELLED. After the application is done with the object, it must call Release( ) to free the COM object. A NULL pointer passed to the DVD API indicates that no command object should be returned to the application and the command execution should continue in the standard asynchronous mode.

The other two methods GetStartHandle( ) and GetEndHandle( ) return a system specific synchonization object that allows the application to wait for other requests (disc I/O, user interface changes, semaphore changes, unblocking threads, communications with other processes, etc) to be processed while it wait for the start or end events to occurs. Then the application calls the WaitForStart( ) or WaitForEnd( ) methods to retrieve the result. An example in the Microsoft Windows API:

Using Events

Specifying the DVD_CMD_FLAG_SendEvents flag will cause the Navigator to issue the following events:
{EC_DVD_CMD_START, lParam1, HRESULT}
{EC_DVD_CMD_END, lParam1, HRESULT}.

If an application only needs to synchronize one command (or does not differentiate between command instances), no synchronization object is needed and only events are required. A NULL object pointer is passed to the DVD API method and the lParam1 value sent with the event will always be set to 0.

Using Events and Objects

By specifying both objects and the DVD_CMD_FLAG_SendEvents flag, an application can track different commands. The DVD2 API call will return an object that the application can use for later reference. When the event notification is sent, the DVD2 API generates a unique identifier (or 'cookie') lParam1 for each event that the application can map back to an IDvdCmd object. The cookie approach ensures that applications will not leak memory if they miss an event and allows the DVD Navigator to verify the validity of the object.

The DVD2 API method IDvdInfo2::GetCmdFromEvent (lParam1) maps the cookie into a command object pointer. The application must call the COM "Release" method on the returned pointer after it has finished processing each of these events. When the application is completely finished with the message (usually after receiving an END event), it must call "Release" on the global command pointer that it saved.

Example of Blocking/Non-Blocking

```
handleStart = GetStartHandle( )
Signaled = WaitForMultipleObjects( handleDiscIO, handleUserInter, . . . , handleStart )
If signaled = handleStart
    Result = DvdCmd->WaitForStart( )
```

Not Using Objects

Instead of managing an object, the application can simply specify the DVD_CMD_FLAG_Block flag with a null object pointer. The command will not return until it has either completed or was cancelled. The API will emulate a synchronous behavior. For example:

The following illustrative examples show how synchronization can be accomplished using the IDvdControl2 interface:

For clarity, some of the examples refer to the following utility function used to map the lParam1 value from EC_DVD_CMD events into an IDvdCmd object:

```
HRESULT hres = IDvdControl2->PlayTitle(uTitle, DVD_CMD_FLAG_Block, 0);
is semantically equivalent to:
IDvdCmd* pObj;
HRESULT hres = IDvdControl2->PlayTitle( uTitle,
DVD_CMD_FLAG_Block, &pObj );
If( succeeded ( hres ) ) {
    Hres = pObj->WaitToEnd( );
    pObj->Release( );
}
```

```
IDvdCmd* GetDvdCmd( LONG_PTR lParam )
{
    IDvdCmd* pCmd;
    pIDvdInfo2->GetCmdFromEvent(iParam, &pCmd);
    return pCmd;
}
```

No Synchronization (Asynchronous Model)

The application calls the method to request an action:

```
HRESULT hres=IDvdControl2->PlayTitle(uTitle, 0,
    NULL);
```

Synchronization Without Events

An example of the correct way to wait for a command to end without using events is:

```
IDvdCmd* pObj;
HRESULT hres = IDvdControl2->PlayTitle( uTitle, 0, &pObj );
If( SUCCEEDED ) hres)) {
    pObj -> WaitToEnd ( );
    pObj -> Release ( );
}
```

Partial Synchronization Using Events

To synchronize a single event without managing IDvdCmd objects:

```
HRESULT hres = IDvdControl2->PlayTitle( uTitle,
    DVD_CMD_FLAG_SendEvents, NULL);
Function ProcesEvent( type, lParam1, lParam2 )
{
    switch( type )
    {
```

```
    case EC_DVD_CMD_END:
        HRESULT hres = lParam2; // result code is in lParam2
    break;
    }
}
```

Full Synchronization Using Events

An example of the correct way to wait for a command using events is:

```
// in global code
IDvdCmd* pGlobalObj = 0;
// Note: pGlobalObj is assigned by the Navigator BEFORE the event
// is issued; otherwise the event can occur at point (*I) before
// pGlobalObj is initialized.
HRESULT hres = IDvdControl2->PlayTitle( uTitle,
DVD_CMD_FLAG_SendEvents, &pGlobalObj );
// (*I)
If( FAILED ( hres ) ) {
    pGlobalObj = NULL;
}
...
In the event processing function:
Function ProcessEvent( type, lParam1, lParam2 )
switch (type)
{
case EC_DVD_CMD_END:
    IDvdCmd* pObj = GetDvdCmd( lParam1 );
    HRESULT hres = lParam2;
    If( NULL != pObj ) {
        // if the object returned by the event matches the global pointer returned
        // by the Play Title, process it
        If (pGlobalObj == obj) {
            ProcessCmdEnd . . .
            pGlobalObj->Release( );
            pGlobalObj = NULL;
        }
        pObj -> Release ( );
    }
break;
```

Full Synchronization Using Events and a Separate Event Loop Thread

An example of the correct way to wait for a command using events is:

```
// in global code
IDvdCmd* pGlobalObj=0;
{
    LockCriticalSection
    HRESULT hres = IDvdControl2->PlayTitle( uTitle,
        DVD_CMD_FLAG_SendEvents, &pGlobalObj );
    If( FAILED ( hres) ) {
        pGlobalObj = NULL;
    }
    UnlockCriticalSection
}
Function ProcessEvent( type, lParam1, lParam2 )
switch (type)
{
    case EC_DVD_CMD_COMPLETE:
    case EC_DVD_CMD_CANCEL:
    {
        CautoLock(globalCritSect);
        IDvdCmd* pObj = GetDvdCmd( lParam1 );
        HRESULT hres = lParam2
        If( NULL = pObj ) {
            If(pGlobalObj == obj) {
```

```
            -continued pGlobalObj -> Release ( );
        pGlobalObj = NULL;
    }
    pObj->Release( );
  }
  break;
}
```

Exemplary Playback Interactivity Control Mechanism

Previous DVD API commands assumed that on any change of content, player application 102 wanted to truncate the current content presentation, and it switched to the new content. The improved DVD2 API commands extend the command object mechanism with the following flags:

DVD_CMD_FLAG_Flush

DVD_CMD_FLAG_StartWhenRendered

DVD_CMD_FLAG_EndAfterRendered.

Here, the . . . _Flush flag indicates that the presentation of the current content should be immediately truncated so that new content can start to be displayed (like before). The absence of the flag indicates that the current content presentation should end first. The . . . _ . . . Rendered flags change the semantics of the start and end of each command. By default, the command starts and ends once it has been processed. The new flags indicate that the start and end occur when the results of the change of content have been processed and presented respectively.

Exemplary Disc Communication Mechanism

DVD2 API 108a–b permits player applications not only to read the DVD Navigator's general purpose registers (the GPRMs), but also allows them to set the GPRMs using:

IDvdInfo2::GetAllGPRMs(WORD pwRegisterArray [16])

IDvdControl2::SetGPRM(ULONG ulindex, WORD wValue, DWORD dwFlags, IDvdCmd** ppCmd).

The combined read/write functionality allows DVD applications to 'communicate' with the program on the disc and can implement 'controlled unlocking' or restricted access to the content. The application can use GetAllGPRMs to read the current state and set a specific register using SetGPRM.

The SetGPRM method can also be used to synchronize the application and the DVD Navigator's virtual CPU. The SetGPRM method is executed only during the periods when the DVD Navigator is allowed to process user commands (the Presentation and Still phases, 3.3.6.1 V13–28). Navigation command execution is considered to be atomic. So setting the GPRM is postponed until these phases occur. The application can use the command object and event mechanism to ensure coordination. The command object's event mechanism is serialized with event notifications (such as domain changes or changes to system registers). The application can call SetGPRM and wait until the command completion event is received, and then wait for an event indicating a change the DVD navigator's state (possibly a domain change).

One such way to accomplish disc to application communication is illustrated by the following pseudocode:

Disc sends data and awaits reply:
  Disc alters a GPRM value (using a on-disc navigation command)
  Disc changes its state (e.g. changes its domain)
  Loops waiting for a GPRM change (caused by the application)

Application receives GPRM data and replies:
  Waits for the state change (e.g. the disc's domain change)
  Reads GPRM value
  Sets a GPRM value using SetGPRM One such way to accomplish application to disc communication is illustrated by the following pseudocode:

Application sends data and awaits acknowledgement:
  Application sets the data using SetGPRM
  Application waits for a domain change before continuing Disc receives data and returns acknowledgement:
  Disc reads GPRM
  Disc changes its state (e.g. changes its domain).

Exemplary Query (Info) Interfaces

Even though the DVD specification does not suggest any data retrieval methods, the DVD2 APIs do provide this capability. The following is a list of methods provided:

GetAllGPRMs

GetAllSPRMs

GetAudioLanguage

GetCurrentAngle

GetCurrentAudio

GetCurrentButton

GetCurrentDomain

GetCurrentLocation

GetCurrentSubpicture

GetNumberOfChapters

GetPlayerParentalLevel

GetSubpictureLanguage

GetTotalTitleTime

GetTitleParentalLevels

GetCurrentUOPS

GetCurrentVolumeInfo (IDVD1::GetDVDVolumeInfo)

GetDVDDirectory (IDVD1::GetRoot)

GetAudioAttributes([in] ULONG ulStream, [out] DVD_AudioAttributes *pATR);

GetCurrentVideoAttributes([out] DVD_VideoAttributes * pATR):

GetVMGAttributes([out] DVD_MenuAttributes * pATR);

GetTitleAttributes(ULONG ulTitle, [out] DVD_MenuAttributes * pMenu, [out] DVD_TitleAttributes* pTitle);

GetSubpictureAttributes([in] ULONG ulStream, [out] DVD_SubpictureAttributes *pATR);

GetButtonAtPosition(POINT point, [out] ULONG *puButtonIndex);

GetButtonRect(ULONG ulButton, RECT *pRect):

GetDefaultAudioLanguage(LCID* pLanguage, DVD_AUDIO_LANG_EXT* pAudioExt):

GetDefaultMenuLanguage(LCID* pLanguage):

GetDefaultSubpictureLanguage(LCID* pLanguage, DVD_SUBPICTURE_LANG_EXT*pSubpictureExtension);

GetDVDTextLanguageInfo(ULONG ulLangIndex, ULONG* pulNumOfStrings, LCID*pwLangCode, DVD_TextCharSet * pbCharacterSet);

GetDVDTextNumberOfLanguages(ULONG * pulNumOfLangs);

GetDVDTextStringAsNative(ULONG ulLangIndex, ULONG ulStringIndex, BYTE*
pbBuffer, ULONG ulMaxBufferSize, ULONG* pulActualSize, enum
DVD_TextStringType* pType);
GetDVDTextStringAsUnicode(ULONG ulLangIndex, ULONG ulStringIndex,
WCHAR*pchBuffer, ULONG ulMaxBufferSize, ULONG*pActualSize,
DVD TextStringType* pType);
GetCmdFromEvent(LONG_PTR dwID, IDvdCmd** ppCmd);
GetDecoderCaps(DVD_DECODER_CAPS *pCaps);
GetDiscID(LPCWSTR pszwPath, ULONGLONG* pullUniqueID):
GetKaraokeAttributes([in] ULONG ulStream, DVD_KaraokeAttributes *PATR);
GetMenuLanguages(LCID *pLang, ULONG uMaxLang, ULONG *puActualLang);
IsAudioStreamEnabled(ULONG ulStreamNum, BOOL *pbEnabled);
IsSubpictureStreamEnabled(ULONG ulStreamNum, BOOL *pbEnabled);

Exemplary Control Interfaces

1) Period Playback Interface

In addition to playing ranges of chapters, the DVD2 API allows the playing of time periods using:

PlayPeriodInTitleAutoStop(ULONG ulTitle, DVD_HMSF_TIMECODE* pStartTime, DVD_HMSF_TIMECODE*pEndTime, DWORD dwFlags, IDvdCmd** ppCmd).

With this method, applications (such as video editing programs and games) can accurately playback arbitrary portions of the content. Combined with the command object mechanism, any application like slideshow presentation, video games interludes, or kiosks can be implemented using a single DVD2 API command.

2) Default Language Interfaces

SelectDefaultAudioLanguage(LCIDLanguage,DVD_AUDIO_LANG_EXT audioExtension)

SelectDefaultSubpictureLanguage(LCIDLanguage, DVD_SUBPICTURE_LANG_EXT subpictureExtension).

These methods allow applications (from user) to set the default language choices for DVD playback.

3) Button index selection

Applications can now automate menu navigation through the method SelectButton(ULONG ulButton).

4) Bookmarking APIs

Applications can save and restore the entire DVD state (see bookmark patent)

GetState(IDvdState **pStateData)

SetState(IDvdState*pState, DWORD dwFlags, [out] IDvdCmd*ppCmd).

5) Other

AcceptParentalLevelChange(BOOL bAccept)—Please refer to the following "Minimum parental level branching" section.

SetGPRM(ULONG ulindex, WORD wValue, DWORD dwFlags, [out] IDvdCmd**ppCmd)—

SetOption(DVD_OPTION_FLAG flag, BOOL bEnable)-extendible option setting mechanism.

Mechanism for Coordinating Minimum Parental Level Branching

According to the DVD specification (section 4.6.4.1 pV14–197), when the DVD Navigator encounters a 'SetTmpPML' (set temporary parental management level) command, it should request permission from the application ("call the Temporary Parental level Change feature built into the player") to temporarily raise the current level. If the parental level change is allowed, the Navigator raises the parental level and branches to the restricted piece of content. Otherwise, it continues with the next command.

Under the semantics of the previous DVD API, when the DVD navigator executes a SetTmpPML instruction, it only sends a PARENTAL_LEVEL_TOO_LOW event to the application. It immediately continues on executing the next command as if the parental level change failed. The application receives the event, stops the playback, displays a user interface to change the parental level, and then restarts the movie from the beginning. According to the DVD specification, the Navigator is allowed to alter the parental level only when it is in the STOP Domain. As a result, since the navigator does not pause at the change it must stop the playback.

With DVD2 API 108a–b, for example, the following sequence may occur. The application notifies the API of the availability of the parental level change feature by calling the method:

IDVDControl2::SetOption(DVD_NotifyParentalLevelChange, TRUE).

When the DVD Navigator encounters a SetTmpPML instruction, it sends a PARENTAL_LEVEL_TOO_LOW event to the application. The application is expected to display some user interface to let the user increase the parental level. The DVD Navigator blocks until the application responds by calling IDVDControl2::AcceptParentalLevelChange( ) with TRUE or FALSE, and then proceeds accordingly without having to stop the playback.

Mechanism for Aiding Playback of Multi-Segment Parental Level Branches

The DVD specification (Section 4.1.4.1 V14–22) describes a scheme for selecting different program chains (usually different possible segments of content) based on the current parental level. For example, at a certain point in the video, different versions of a scene could be available and are automatically selected by the navigator based on the parental level (e.g. segments intended for PG, R rated or children).

For each title, the PTL_MAI table maps the current parental level into a 16-bit mask. During playback, the DVD Navigator obtains the current parental bit mask from the PTL_MAI table. The parental bit mask is used when the Navigator encounters a parental block (a collection of program chains in which each program chain has an exclusive parental bit mask). The Navigator searches each PTLID_FLD in the VTS_PGCI_SRP (Section 4.2.3 V14–62) for a program chain with a bit mask that shares common bits with the current parental bit mask.

If no program chain partially matches the current bit mask, previous versions of the DVD Navigator would halt the playback and send a DVD_ERROR_LowParentalLevel event to the application.

To help the user, certain exemplary implementations of DVD2 API 108a–b uses the following algorithm to compute the minimum required parental level that would let the user continue:

Initialize PTL_MASK=0 (the possible allowed parental levels).

For each program chain index i in the VTS_PGCI_SRP

```
If VTS_PGC1_SRP[i].BlockType = 1 (in a parental block)
    PTL_MASK = PTL_MASK union VTS_PGC1_SRP[i].PTL_ID_FLD
If PTL_MASK = 0 then
    no parental level is present, so any level will work
Else
for each parental level index i in the PTL_MAI
    Let PTL_LVLI = PTL_MAI[8-i]
    If PTL_LVLI[title_index] & PTL_MAI[8 - i] = 0
        (note: title_index = 0 in the VMGM domain)
        Return i
```

The index i is returned along with the DVD_ERROR_LowParentalLevel event. The application 102 can use the index to suggest a possible parental level setting to the user.

Bookmarking

Figure 13:
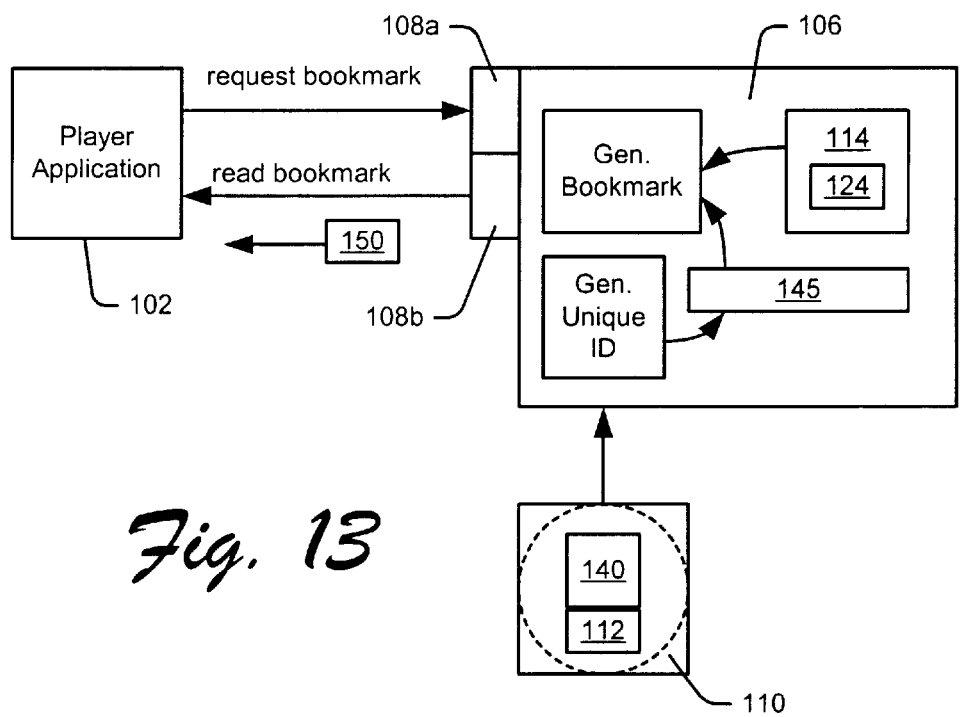
FIG. 13 is a block diagram depicting exemplary media content bookmarking functionality.

DVD navigator 106 is configured to allow a player application 102 to encode and store the current state 114 of the DVD playback into an abstract object (referred to a bookmark 150) containing a persistent block of data. FIG. 13 depicts exemplary bookmarking functionality.

To further abstract and simplify the usage, DVD2 API 108a–b is configured to save, restore and query the state information contained in the bookmark. Player application 102 can query information in the bookmark 150 using the navigator 106 and save it for later use. Player application 102 can later resume playback by instructing the DVD navigator 106 to restore the DVD playback state 114 contained in the bookmark. Restoring bookmarks allows the player application to start playing from any arbitrary location, and any number of them for a DVD content 110. The bookmarks can be stored either in short term (memory) storage or long term storage (for example, a hard drive), and can be restored even after player application 102 and/or the PC has been shutdown and restarted. The bookmark not only contains the state of the DVD navigator (such as internal register values, playback location, playback state) but also the information about the current disc content being played and the user's settings. Player application 102 can use this extra information to intelligently select the appropriate bookmark from previously saved ones that can be played for a particular disc (usually the disc being played), for example. Bookmarks can be also be shared between users and between various applications.

The bookmarking abstract data type is comprised of two aspects; 1) the actual bookmark 150 itself, and 2) the API calls used to save, restore and query information contained in the bookmark. In accordance with certain exemplary implementations, bookmark 150 contains at least the following information: a substantially unique disc identifier 145, the address of the current video object unit (VOBU) being displayed (section 5.1.1 of the DVD specification), the loop count and shuffle history (Section 3.3.3.2 of the DVD specification), the current DVD resume information (outlined in section 3.3.3.2 of the DVD specification), the current DVD general parameter (GPRM) and system parameter (SPRM) values (sections 4.6.1.1 and 4.6.1.2), and the current domain and phase (section 3.3.3 and 3.3.6). In certain further implementations, the bookmark also includes versioning and integrity information. The bookmark 150 can be packaged as an abstract object or as a block of binary data for storage.

To provide such bookmarking techniques, DVD2 API 108 in certain exemplary implementations supports the following methods:

1. To create a bookmark from the current location Bookmark=GetBookmark( )
2. To cause the DVD Navigator to change its location to the bookmark SetBootmark(bookmark)
3. To find out the disc that a bookmark is intended for DiscID=GetDiscIdentifierFromBookmark(bookmark)
4. To convert a bookmark to and from its binary representation: BinaryData(data,size)=ConvertBookmarkToBinary(bookmark) Bookmark=ConvertBinaryToBookmark(BinaryData).

Application pseudocode to implement storing the current location or to implement power saving functionality (i.e. the ability to save the computer's state to enter a low power state that can be restored):

Bookmark=GetBookmark( )

BinaryData(data,size)=ConvertBookmarkToBinary(bookmark)

Store BinaryData(data,size)

Shutdown or enter power saving.

On return from power saving, do the following to resume playback of DVD:

Retrieve BinaryData(data,size)

Bookmark=ConvertBinaryToBookmark(BinaryData)

If GetDiscIdentifierFromBookmark(bookmark)=current Disc Id

Then

SetBootmark(bookmark).

An example of pseudocode for an application to implement intelligent bookmarks

For each stored bookmark "bookmark"

If GetDiscIdentifierFromBookmark(bookmark)=current Disc Id Then

Add bookmark to the user selectable list.

Unique Identifier Generation

The current DVD specification has a built-in unique identifier on each disc ("DVD unique identifier"). However, applications must assume that the disc authors correctly implemented the identifier; unfortunately, this not always so.

Many applications need a unique tag to identify a DVD disc, such as when a user swaps DVD discs, the playback system needs to decide if it has a new disc. If it has a new disc, then it must reset the playback, otherwise it can continue without interrupting the user's viewing. If it does not have the ability to differentiate discs, it must always reset. A unique identifier 145 (see, FIG. 13) would provide the ability to differentiate different discs (not different exact copies, however).

A unique identifier 145 also lets applications verify the compatibility of stored information with a particular DVD disc. Applications cannot successfully use cached information with the wrong disc. For example, when a user attempts to recall a saved location on the disc using a bookmark, the DVD navigator 108 can ensure the data's compatibility by comparing the unique identifier stored in the bookmark with the unique identifier of the current disc. Playback only continues if the identifiers match.

Unique identifiers 145 allow applications to associate additional information with the disc by using the unique identifier as an index into a database. For example, even though the DVD specification supports textual information on the disc, it is rarely used. A web-based database of the disc's title and contents can be stored and retrieved by an application after it computes the identifier on the disc.

The current built-in unique identifier on the DVD disc is inadequate. First, the identifier is relatively large in size (32 bytes), it relies on the disc author to ensure that it is actually unique, and a central entity must assign ranges of identifiers to disc authors to ensure that the uniqueness is maintained between companies.

Other conventional "unique" identifier algorithms do not produce unique identifiers for a large numbers of discs. Here, the probability that two discs are assigned the same identifier grows exponentially as the total number of DVD discs increases. With the expected growth trends in DVD discs, many 'unique' identifier routines will be inadequate. Moreover, these algorithms often do not have known, and/or provable properties. Without known properties, it is impossible to state the effectiveness or suitability of the identifiers produced.

Figure 14:
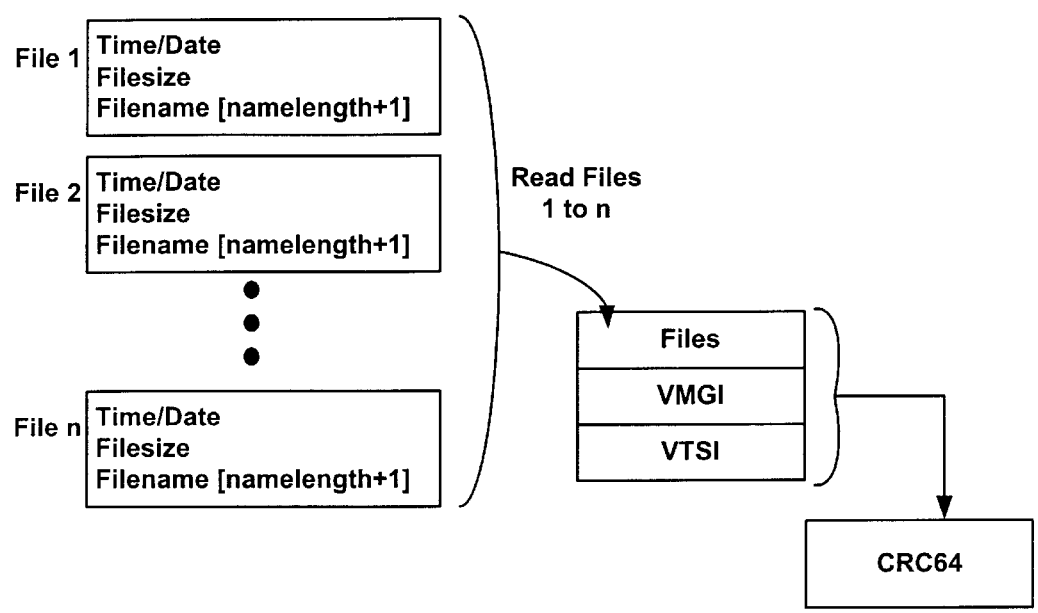
FIG. 14 is an illustrative diagram depicting an exemplary method for generating a substantially unique identifier for a media source.

In accordance with certain exemplary implementations of the present invention, a unique identifier 145 is generated by computing a 64-bit CRC of a concatenated or otherwise arranged binary representation of the file header and the file contents of various files in the DVD's VIDEO TS directory. This is capability is further illustrated in FIGS. 13 and 14.

A UniqueID2 algorithm generates the identifier in four steps:

Step 1. The filenames of the VIDEO_TS directory are collected and sorted alphabetically.

Step 2. The file headers from each file are computed in the CRC.

Step 3. The data from the VMGI file ("VIDEO_TS\VIDEO_TS.IFO") is computed in the CRC.

Step 4. The data from the first VTSI file ("VIDEO_TS\VTS_xx_0.IFO") is computed in the CRC.

The 64-bit CRC is computed using an irreducible polynomial in the field GF(2). An example polynomial is:

$$P_{64}=x^{64}+x^{61}+x^{58}+x^{56}+x^{55}+x^{51}+x^{50}+x^{47}+x^{42}+x^{39}+x^{38}+x^{35}+x^{33}x^{32}+x^{31}+x^{29}+x^{26}+x^{25}+x^{22}+x^{17}+x^{14}+x^{13}+x^9+x^8+x^6+x^3+x^0$$

The polynomial is generated by finding an exponent n such that $x^n-1$ has an irreducible (prime) factor of degree 64.

The actual CRC value is computed, in certain examples, by concatenating all of the binary data into a single block (bits $b_o$ to $b_n$), assigning each bit $b_i$ to the coefficient $x^i$ in a polynomial, then computing the remainder after dividing by the polynomial $P_{64}$:

$$CRC_{64} = \left[\sum_{i=0}^{n} b_i x^i\right] \mod p_{64}$$

Here's an exemplary implementation:
Step 1
The filenames of the VIDEO_TS directory are collected and sorted alphabetically in to a list.

Step 2
For each filename in the list, the following structure is filled out and added to the CRC (all data fields are in LSB first):

Unsigned 64 bit integer: dateTime (the time elapsed in 100 nanosecond intervals from Jan. 1, 1601)

unsigned 32 bit integer: dwFileSize

BYTE bFilename[filename Length]

BYTE bFilenameTermNull=0.

Step 3
If present, the first 65536 bytes of the file "VIDEO_TS\VIDEO_TS.IFO" are read and added to the CRC. If the IFO file is less than 65536, then the entire file is added.

Step 4
If present, the first 65536 bytes of the file "VIDEO_TS\VTS_01_0.IFO" are read and added to the CRC. If the IFO file is less than 65536, then the entire file is added.

Although some preferred implementations of the various methods and arrangements of the present invention have been illustrated in the accompanying Drawings and described in the foregoing Detailed Description, it will be understood that the invention is not limited to the exemplary implementations disclosed, but is capable of numerous rearrangements, modifications and substitutions without departing from the spirit of the invention as set forth and defined by the following claims. Additionally, each of the references identified above is expressly incorporated in their entirety herein, by reference, and for all purposes.

What is claimed is:

1. A method for generating a substantially unique identifier for a multimedia content medium, the method comprising:

collecting filenames defined in a directory;

sorting the filenames into a list that matches a defined ordering scheme;

gathering data from at least a portion of at least one file; and computing a cyclic redundancy check (CRC) based on the collected filenames and the gathered data.

2. The method as recited in claim 1, wherein the multimedia content includes digital versatile disc (DVD) content.

3. The method as recited in claim 2, wherein the directory includes a VIDEO_TS directory.

4. The method as recited in claim 2, wherein the gathered data includes data selected from the VMGI file.

5. The method as recited in claim 2, wherein the gathered data includes data selected from the VTSI file.

6. The method as recited in claim 2, wherein the gathered data includes data selected from the VMGI file and the VTSI file.

7. The method as recited in claim 1, wherein the CRC is computed using an irreducible polynomial, $P_{64}$, that is generated by finding an exponent n such that $x^n-1$ has an irreducible (prime) factor of degree 64.

8. The method as recited in claim 7, wherein the CRC value is computed by selectively arranging all of the binary data into a single block (bits $b_o$ to $b_n$), assigning each bit $b_i$ to the coefficient $x^i$ in a polynomial, then computing the remainder after dividing by the polynomial $P_{64}$:

$$CRC_{64} = \left[\sum_{i=0}^{n} b_i x^i\right] \mod p_{64}.$$

9. A computer-readable medium having computer-executable instructions for generating a substantially unique identifier for a multimedia content medium, the computer-executable instructions performing steps comprising:
- collecting filenames defined in a directory;
- sorting the filenames into a list that matches a defined ordering scheme;
- gathering data from at least a portion of at least one file; and
- computing a cyclic redundancy check (CRC) based on the collected filenames and the gathered data.

10. The computer-readable medium as recited in claim 9, wherein the multimedia content includes digital versatile disc (DVD) content.

11. The computer-readable medium as recited in claim 10, wherein the directory includes a VIDEO_TS directory.

12. The computer-readable medium as recited in claim 10, wherein the gathered data includes data selected from the VMGI file.

13. The computer-readable medium as recited in claim 10, wherein the gathered data includes data selected from the VTSI file.

14. The computer-readable medium as recited in claim 10, wherein the gathered data includes data selected from the VMGI file and the VTSI file.

15. The computer-readable medium as recited in claim 9, wherein the CRC is computed using an irreducible polynomial, $P_{64}$, that is generated by finding an exponent n such that $x^n-1$ has an irreducible (prime) factor of degree 64.

16. The computer-readable medium as recited in claim 15, wherein the CRC value is computed by selectively arranging all of the binary data into a single block (bits $b_o$ to $b_n$), assigning each bit $b_i$ to the coefficient $x^i$ in a polynomial, then computing the remainder after dividing by the polynomial $P_{64}$:

$$CRC_{64} = \left[\sum_{i=0}^{n} b_i x^i\right] \mathrm{mod} p_{64}.$$

* * * * *